(12) United States Patent
Unger et al.

(10) Patent No.: US 6,378,902 B2
(45) Date of Patent: Apr. 30, 2002

(54) KNEE AREA PROTECTION APPARATUS HAVING A DEPLOYMENT GUIDING PLATE AND A RETAINING BAND SYSTEM THEREFOR

(75) Inventors: Johann Unger, Mainburg; Maria Müller, Neukirchen; Harald Schuler, Niederroth; Michael Helbig, München, all of (DE)

(73) Assignee: Autoliv Development AB (SE)

( * ) Notice: Subject to any disclaimer, the term of this patent is extended or adjusted under 35 U.S.C. 154(b) by 0 days.

(21) Appl. No.: 09/815,924

(22) Filed: Mar. 23, 2001

(30) Foreign Application Priority Data

Mar. 24, 2000 (DE) .......................................... 100 14 422

(51) Int. Cl.⁷ .......................................... B60R 21/045
(52) U.S. Cl. ........................ 280/753; 280/751; 280/752
(58) Field of Search ................. 280/748, 751, 280/752, 753

(56) References Cited

U.S. PATENT DOCUMENTS 5,536,043 A * 7/1996 Lang et al. .................. 280/753
5,931,493 A * 8/1999 Sutherland ................... 280/753
6,039,380 A * 3/2000 Heilig et al. ................. 280/753
6,193,272 B1 * 2/2001 Aigner et al. ................ 280/753

FOREIGN PATENT DOCUMENTS

DE 196 53 174 A1 6/1998
EP 0 885 783 A1 12/1998

* cited by examiner

Primary Examiner—Eric Culbreth
(74) Attorney, Agent, or Firm—Robert W. Becker & Associates; R. W. Becker

(57) ABSTRACT

A knee area protection apparatus for the protection of a vehicle occupant is provided which includes a deployment guiding plate and a support plate each having a top transverse edge, a bottom transverse edge, and side edges. The support plate is securable to the vehicle in a lower area of a seat compartment thereof. The knee area protection apparatus also includes retaining bands to retain and guide an air bag sack as it is deployed as well as to retain and guide the deployment guiding plate, which is moved by the deployment of the air bag sack.

9 Claims, 2 Drawing Sheets

KNEE AREA PROTECTION APPARATUS HAVING A DEPLOYMENT GUIDING PLATE AND A RETAINING BAND SYSTEM THEREFOR

BACKGROUND OF THE INVENTION

The present invention relates to a knee area protection apparatus for a vehicle occupant which comprises an air bag sack, inflatable upon deployment, which is held ready in its non-deployed condition behind a covering at a location in the foot area of the vehicle seating compartment or the lower region of the instrument panel of the vehicle. The air bag sack is of the type that, upon its inflation during deployment, effects the release of the covering relative to a support plate which normally retains the covering in its covering position in the non-deployed condition of the air bag sack. The deployment movement of the air bag sack moves the covering in the direction of the knee area of the seat occupant and a plurality of retaining, guiding, and positioning straps, whose slack is taken up by the movement of the covering, guide the covering into, and retain the covering in, its final position.

A knee area protection apparatus of the type just described is disclosed in EP 0 885 783 A1; the disclosed knee area protection apparatus has a substantially right-angled cover which assumes the role of a deployment guiding plate upon the deployment of the air bag sack and which is retained via four retaining bands extending between and connected to the cover and a support plate. The length and the connection location of each retaining band is configured such that, during the deployment movement of the cover due to the inflation of the air bag sack (during which the cover assumes its role as a deployment guiding plate), the deployment guiding plate experiences an upward movement or a descending movement relative to the fixedly mounted support plate or, respectively, the instrument panel of the vehicle. The four retaining bands are arranged respectively in the area of the vertically extending side edges of the deployment guiding plate such that (1) these retaining bands engage the sides of the inflating air bag sack, as a result of which the coupling of the retaining band secured in the area of the top transverse edge of the deployment guiding plate is shifted downwardly in the vertical direction by a predetermined amount, (2) this retaining band adjacent the top edge assumes a diagonal course in the initial phase of the unfolding of the air bag sack and (3) the retaining band, once its slack is taken up, acts to effect the upward movement of the deployment guiding plate. In accordance with an embodiment of this known knee area protection apparatus, it is in any event provided that the retaining bands, which are arranged in a vertical series relative to one another, are each respectively formed as a single piece and each of these individual single length retaining bands is trained from its connection at the top transverse edge of the support plate through an opening in the deployment guiding plate, from there across the outer surface of the deployment guiding plate in a downward direction, thereafter through another opening, and finally to its connection at the bottom transverse edge of the support plate.

The known knee area protection apparatus still bring with them the disadvantage that may occur when, as a result of the differing lengths of the individual retaining bands during the unfolding of the inflating air bag sack and the shifting course of movement of the deployment guiding plate during this unfolding, the deployment guiding plate reaches a non-final tilted position from which it is then drawn backward in a correcting movement into its final position as the retaining bands use up their slack and become fully extended. In this event, if the deployment guiding plate, upon reaching this non-final tilted position, is already in contact with the knees of the seat occupant, it cannot be ruled out that the seat occupant may be injured. A further disadvantage resides in the fact that it cannot be foreclosed that, in such a tilted position of the deployment guiding plate, the air bag sack will press upwardly or downwardly through the open space between the support plate and the deployment guiding plate, whereby this air bag sack bulging movement can additionally impact the position of the deployment guiding plate.

SUMMARY OF THE PRESENT INVENTION

The present invention offers a solution to the challenge of providing a knee area protection apparatus which is so configured that, at each point in time during the unfolding of the inflating air bag sack, the movement of the deployment guiding plate of the knee area protection apparatus being driven by the air bag sack inflation occurs continually along a prescribed movement path into the final position of the deployment guiding plate.

The present invention provides, in accordance with its core concept, a knee area protection apparatus comprising a pair of retaining bands extending substantially vertically, each between a respective side edge of the support plate and a side edge of the deployment guiding plate with each retaining band being engaged at the upper region of the support plate and the lower region of the deployment guiding plate such that the retaining band assumes a diagonal course upon inflation of the air bag sack and engages the air bag sack along its side, and further comprising a pair of retaining bands each extending between the regions of the support plate and the deployment guiding plate bordering on the top transverse edges thereof and between the regions of the support plate and the deployment guiding plate bordering on the bottom transverse edges thereof with the connections of these pair of retaining bands to the support plate and the deployment guiding plate being configured such that these further pair of retaining bands assume diagonal courses upon inflation of the air bag sack and engage the air bag sack along its top and bottom. In contrast to the known knee area protection apparatus, the number of segments of the retaining bands of the knee area protection apparatus of the present invention between the support plate and the deployment guiding plate is increased from four to six so that the air bag sack is now engaged by the retaining bands from top and bottom as well. In this manner, a definitive guiding of the deployment guiding plate during its movement away from the support plate is ensured. Only one respective retaining band is arranged on each side edge of the support plate and the deployment guiding plate of the knee area protection apparatus of the present invention while, in the regions of the top and bottom edges, respective pairs of the retaining bands, or respective pairs of segments of the retaining bands, are provided.

In accordance with one embodiment of the knee area protection apparatus of the present invention, it is provided that, in connection with the retaining bands which interconnect, respectively, the top transverse edges of the support plate and the deployment guiding plate and the bottom transverse edges of the support plate and the deployment guiding plate, the retaining bands on the same respective side of the high axis of the knee area protection apparatus are arranged such that those portions thereof extending between the bottom transverse edges of the support plate and the deployment guiding plate have diagonal courses which are linear extensions of the diagonal courses of the portions of the retaining bands extending between the top transverse edges of the support plate and the deployment guiding plate. In this manner, the retaining bands or the portions thereof extending diagonally over the front surfaces of the deployment guiding plate have an overall V-shaped profile.

While the knee area protection apparatus of the present invention can be configured alternatively with separate side retaining bands for two respective sides of the support plate and the deployment guiding plate, in accordance with one embodiment of the knee area protection apparatus of the present invention, it is provided that a single retaining band comprises both side segments and that the single retaining band is trained through openings in the deployment guiding plate and has a portion extending between the openings along the respective face of the deployment guiding plate which faces away from the support plate. In this arrangement, the openings for the training therethrough of the side segments of the single retaining band are located high up toward the corners of the deployment guiding plate parallel to the side edges of the deployment guiding plate.

It can be provided that the portion of the single retaining band extending across the face of the deployment guiding plate is secured at at least one location to the deployment guiding plate.

Along the same lines as the single piece retaining band embodiment of the knee area protection apparatus of the present invention, it can also be provided, in accordance with one embodiment of the knee area protection apparatus of the present invention, that a single retaining band comprises both of the pair of segments trained through and along a respective side of the deployment guiding plate, whereby one segment of the pair extends between the top transverse edges of the support plate and the deployment guiding plate on one side thereof and the other segment extends between the bottom transverse edges of the support plate and the deployment guiding plate and is a linear extension of the other segment of the pair in that the single retaining band is (1) trained through openings in the deployment guiding plate which are arranged in vertical series with, and at a horizontal offset to, one another and (2) extends along the face of the deployment guiding plate away from the support plate. In this manner, each of the two single retaining bands form an overall V-shaped profile.

It can be provided that each of the single retaining bands forming the side retaining band segments can be secured at at least one location to the deployment guiding plate. The securement between the retaining bands or, respectively, the segments of the retaining bands, and the deployment guiding plate can be accomplished by a rivet.

BRIEF DESCRIPTION OF THE DRAWINGS

The object and advantages of the present invention will appear more clearly from the following specification, in conjunction with the drawings, in which.

DETAILED DESCRIPTION OF THE PREFERRED EMBODIMENT

Figure 1:
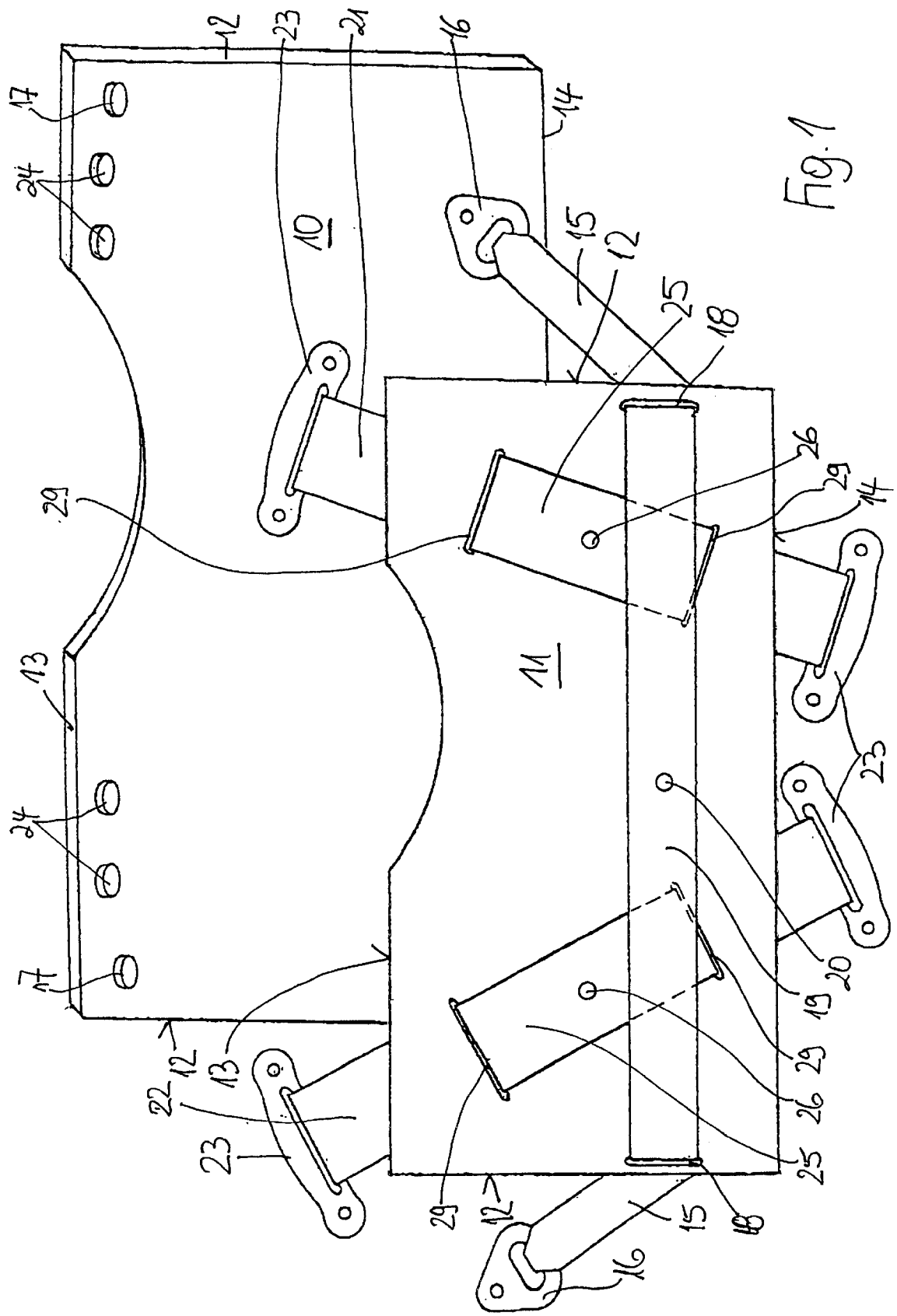
FIG. 1 is a schematic view of the one embodiment of the knee area protection apparatus of the present invention.
Figure 2:
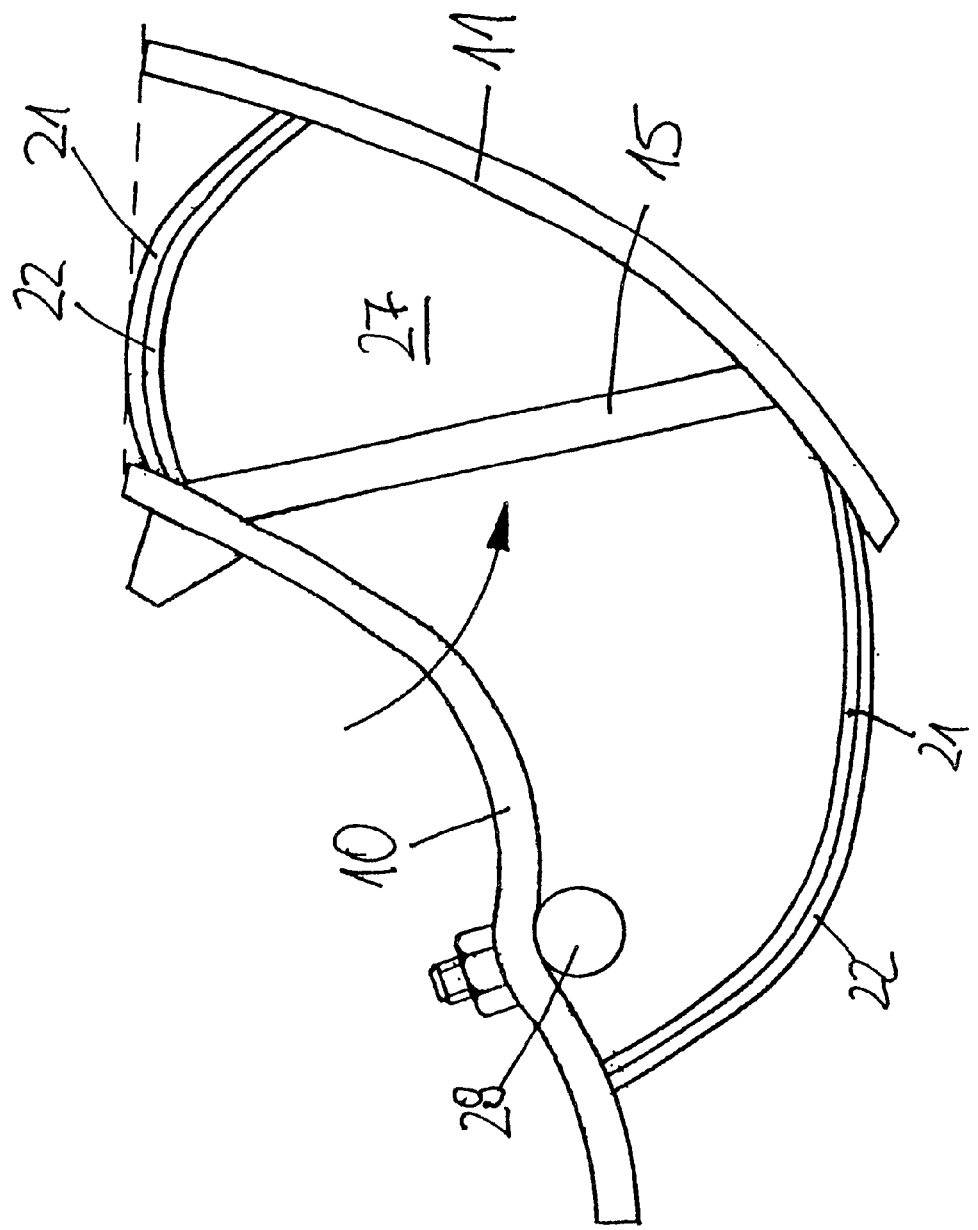
FIG. 2 is a schematic side elevational view of the one embodiment of the knee area protection apparatus of the present invention shown in FIG. 1.

As seen in FIGS. 1 and 2, the one embodiment of the knee area protection apparatus of the present invention includes a support plate 10, which is built into the dashboard of a vehicle and which can alternatively be comprised a form other than a planar form. The support plate 10 as well as the knee area protection apparatus, which is hereinafter described in more detail, can, in particular, be installed in the lower area of the instrument panel under the steering column or in the vicinity of a passenger seat such as, for example, in the glove compartment, whereby the installation results in an inclined disposition of the support plate 10 and the deployment guiding plate 11 secured thereto. An air bag sack (not shown in FIG. 1 but designated as the air bag sack 27 in FIG. 2) is disposed between the support plate 10 and the deployment guiding plate 11 and the unfolding of the air bag sack operates as the mechanism which moves the deployment guiding plate 11 relative to the support plate 10, in the manner of a mechanism of this type as described in detail in EP 0 885 783 A1. The deployment guiding plate 11 is retained relative to the support plate 10, in the non-deployed condition of the air bag sack, by a retaining band system, described shortly in more detail, which together with the air bag sack as it itself is engaged by the retaining band system, acts to guide the deployment guiding plate 11 into its predetermined end position.

The support plate 10 and the deployment guiding plate 11 each comprise substantially vertically extending side edges 12, a top transverse edge 13, and a bottom transverse edge 14 which will be hereinafter referred to in the description of the knee area protection apparatus. In the one embodiment of the knee area protection apparatus of the present invention, a single piece side retaining band 15 is provided, each end of which is secured by a respective band end securing element 16 to a securement element 17 located each on a respective side of the support plate 10 on the upper portion thereof. The retaining band 15 extends from each respective band end securing element 16 in a diagonal direction to the lower portion of the deployment guiding plate 11. The retaining band 15 extends through vertical openings 18 in the deployment guiding plate 11 which are parallel to the side edges 12 and the single piece retaining band has an extent 19 which extends substantially horizontally along that respective face of the deployment guiding plate 11 which is turned away from the support plate 10.

The extent 19 of the retaining band 15 is secured to the turned away face of the deployment guiding plate 11 at at least one location by means of a rivet 20.

A retaining band connection is provided at the respective areas of the top transverse edge 13 and the bottom transverse edge 14 of both the support plate 10 and the deployment guiding plate 11 for the retaining band system which is operable to engage and support the air bag sack 27 in its folded-up, non-deployed condition between the support plate 10 and the deployment guiding plate 11. In the one embodiment of the knee area protection apparatus of the present invention illustrated in FIGS. 1 and 2, the retaining band system is comprised of two single piece retaining bands 21 (right side) and 22 (left side) on the ends of which are secured band end securing elements 23 which secure the retaining bands 21 and 22 to securement elements 24 on the support plate 10. In this manner, four segments of the retaining bands 21, 22 are provided which extend between the support plate 10 and the deployment guiding plate 11.

The arrangement of the retaining bands 21, 22 is configured such that the two retaining bands 21, 22 each exhibit a substantially V-shaped overall profile, whereby the rigidity of the deployment guiding plate is advantageously increased and the danger of a bending or twisting aside of the deployment guiding plate 11 is suppressed. In this connection, the securement elements 24 on the upper region of the support plate 10 adjacent its top transverse edge 13, which secure the retaining bands 21, 22 to the support plate, are disposed to the outside of the one embodiment of the knee area protection apparatus of the present invention while a plurality of openings 29 in the deployment guiding plate 11 through which the retaining bands 21, 22 are trained are each offset downwardly and toward the center of the deployment guiding plate such that each of the retaining bands 21, 22 has an overall diagonal course. Each retaining band 21, 22, at an extent 25 thereof between a respective upper opening 29 and a respective lower opening 29, is secured to the deployment guiding plate 11 by a rivet 26.

As can be seen in FIG. 2, the deployment guiding plate 11 completes an upward swing movement, due to the arrangement of the side-extending retaining band 15 together with the side-extending retaining band segments trained along the deployment guiding plate, such that the upper edge of the deployment guiding plate 11 has been moved to a position at which it extends at a given height generally horizontally towards the seat occupant in spite of the inclined installed position of the support plate 10. The swing movement of the deployment guiding plate 11 is, in addition, reinforced by the inflating air bag sack 27, which, in particular, acts against the upper segments of the retaining bands 21, 22.

In the event of a secondary impact of the vehicle, the arrangement of the retaining bands to engage and support the air bag sack along the sides thereof precludes the deployment guiding plate from moving downwardly in such a manner, as the air bag sack assumes its slackened or less than fully inflated condition, that the securement locations of the retaining bands with the support plate could come into contact with the knees of a seat occupant.

This specification incorporates by reference the disclosure of German priority document 100 14 422.5 of Mar. 24, 2000.

The present invention is, of course, in no way restricted to the specific disclosure of the specification and drawings, but also encompasses any modifications within the scope of the appended claims.

What we claim is:

1. A knee area protection apparatus for the protection of a vehicle occupant, comprising:

a deployment guiding plate having a top transverse edge, a bottom transverse edge, and side edges;

a support plate securable to the vehicle in a lower area of a seat compartment of the vehicle and having a top transverse edge, a bottom transverse edge, and side edges, the support plate being securable to the vehicle such that the side edges of the support plate are generally vertical;

an air bag sack stored, in a non-deployed condition, behind the deployment guiding plate such that the deployment guiding plate operates as a covering plate in the non-deployed condition of the air bag sack;

a first retaining band having a left hand extent defined between a left hand end of the first retaining band secured to an upper region of the support plate and a portion of the first retaining band secured to the deployment guiding plate and a right hand extent defined between a right hand end of the first retaining band secured to the upper region of the support plate and a portion of the first retaining band secured to the deployment guiding plate, the first retaining band being secured to the support plate and the deployment guiding plate such that the left hand extent of the first retaining band is disposed to extend vertically diago-nally along one side of the air bag sack to assist in supporting the air bag sack upon its inflation and the right hand extent of the first retaining band is disposed to extend vertically diagonally along an opposite side of the air bag sack to assist in supporting the air bag sack upon its inflation; and a second retaining band and a third retaining band each having an end secured to the upper region of the support plate, an opposite end secured to a lower region of the support plate, and an extent between the two ends trained along the deployment guiding plate generally from the upper region of the deployment guiding plate bordered by the top transverse edge thereof to the lower region of the deployment guiding plate bordered by the bottom transverse edge thereof such that each of the second and third retaining bands has an overall diagonal course between its two ends and each of the second and third retaining bands engages and supports the top and bottom of the air bag sack upon its inflation.

2. A knee area protection apparatus for the protection of a vehicle occupant according to claim 1, wherein each of the second and third retaining bands are configured such that the extent of the respective retaining band between the lower regions of the support plate and the deployment guiding plate is a direct line continuation of the extent of the retaining band between the upper regions of the support plate and the deployment guiding plate.

3. A knee area protection apparatus for the protection of a vehicle occupant according to claim 1, wherein the first retaining band is a single continuous band forming the left and right hand extents and the deployment guiding plate includes a pair of openings, the left hand extent of the first retaining band being trained through one of the pair of openings in the deployment guiding plate and the right hand extent of the first retaining band being trained through the other of the pair of openings in the deployment guiding plate and the single band extending between the pair of openings in the deployment guiding plate along a respective face of the deployment guiding plate which faces away from the support plate.

4. A knee area protection apparatus for the protection of a vehicle occupant according to claim 3, wherein each of the pair of openings in the deployment guiding plate extends generally parallel to a respective side edge of the deployment guiding plate closely adjacent the respective side edge.

5. A knee area protection apparatus for the protection of a vehicle occupant according to claim 3, wherein the extent of the single continuous first retaining band along the face of the deployment guiding plate is secured to the deployment guiding plate at at least one location.

6. A knee area protection apparatus for the protection of a vehicle occupant according to claim 3, wherein the deployment guiding plate includes a second pair of openings through which the second retaining band is trained such that an extent of the second retaining band extends along the face of the deployment guiding plate which faces away from the support plate and a third pair of openings through which the third retaining band is trained such that an extent of the third retaining band extends along the face of the deployment guiding plate which faces away from the support plate, the second pair of openings and the third pair of openings each including a top opening and a bottom opening lower than the top opening and located inwardly relative to the top opening.

7. A knee area protection apparatus for the protection of a vehicle occupant according to claim 6, wherein each of the second and third retaining bands has a substantially V-shaped overall profile.

8. A knee area protection apparatus for the protection of a vehicle occupant according to claim 7, wherein each of the second and third retaining bands is secured to the deployment guiding plate by a rivet.

9. A knee area protection apparatus for the protection of a vehicle occupant according to claim 6, wherein each of the second and third retaining bands is secured to the deployment guiding plate at at least one location.

* * * * *